United States Patent
Mizutani et al.

(10) Patent No.: US 8,378,665 B2
(45) Date of Patent: Feb. 19, 2013

(54) ROTATION SENSOR-EQUIPPED BEARING DEVICE FOR WHEEL

(75) Inventors: Masatoshi Mizutani, Iwata (JP); Toru Takahashi, Iwata (JP); Masahiro Kiuchi, Osaka (JP)

(73) Assignee: NTN Corporation, Osaka (JP)

( * ) Notice: Subject to any disclaimer, the term of this patent is extended or adjusted under 35 U.S.C. 154(b) by 577 days.

(21) Appl. No.: 12/310,445

(22) PCT Filed: Aug. 16, 2007

(86) PCT No.: PCT/JP2007/000879
§ 371 (c)(1),
(2), (4) Date: Feb. 25, 2009

(87) PCT Pub. No.: WO2008/023459
PCT Pub. Date: Feb. 28, 2008

(65) Prior Publication Data
US 2010/0001720 A1    Jan. 7, 2010

(30) Foreign Application Priority Data
Aug. 25, 2006   (JP) ................. 2006-228833

(51) Int. Cl.
*G01B 7/30* (2006.01)
(52) U.S. Cl. ............. 324/207.25; 324/207.21; 324/173; 384/446
(58) Field of Classification Search ............. 324/207.21, 324/207.22, 207.26, 173, 174, 160; 384/446, 384/448, 490, 494, 548, 482, 485
See application file for complete search history.

(56) References Cited

U.S. PATENT DOCUMENTS
5,055,781 A * 10/1991 Sakakibara et al. ..... 324/207.21
2002/0175574 A1* 11/2002 Okazaki et al. ............. 310/68 B FOREIGN PATENT DOCUMENTS
| JP | 8-129022 | | 5/1996 |
| JP | 2004-37133 | | 2/2004 |
| JP | 2004037133 A | * | 2/2004 |
| JP | 2005-76729 | | 3/2005 |
| JP | 2006-105185 | | 4/2006 |

OTHER PUBLICATIONS

International Search Report for International Application No. PCT/JP2007/000879, mailed Oct. 9, 2007.
English Translation of the International Report on Patentability issued Mar. 12, 2009 in corresponding International Patent Application PCT/JP2007/000879. Japanese Notification of Reason(s) for Rejection dated Jan. 24, 2012 issued in corresponding Japanese Patent Application No. 2006-228833.

* cited by examiner

*Primary Examiner* — Bot Ledynh
*Assistant Examiner* — Son Le

(57) ABSTRACT

A rotation sensor equipped wheel support bearing assembly detects rotational speed and rotational direction, in which a high resolution rotation signal is utilized in various vehicle controls with a suppressed size. The bearing assembly includes a plurality of rows of rolling elements between rolling surfaces in outer and inner members. A magnetic field generating element having anisotropy about a bearing center axis is provided in the outer member in alignment with the axis. The inner member is provided with a sensor for sensing the magnetic field of the magnetic field generating element oriented axially. The sensor detects the angle of rotation of the magnetic field generating element and is in the form of magnetic sensor arrays or elements for detecting the orientation of the magnetic field with a two-dimensional vector sensor to detect rotation of the magnetic field generating element.

5 Claims, 5 Drawing Sheets

PRIOR ART

ROTATION SENSOR-EQUIPPED BEARING DEVICE FOR WHEEL

CROSS REFERENCE TO RELATED APPLICATIONS

This application claims the benefit under 35 U.S.C. Section 371, of International Application No. PCT/JP2007/000879, filed Aug. 16, 2007, which claimed priority to Japanese Application No. 2006-228833, filed Aug. 25, 2006 in the Japanese Patent Office, the disclosures of all of which are hereby incorporated by reference.

BACKGROUND OF THE INVENTION

1. Field of the Invention

The present invention relates to a rotation sensor equipped wheel support bearing assembly for use in, for example, automotive vehicles and, more particularly, to a rotation sensor equipped wheel support bearing assembly suitably employed in a wheel support bearing assembly for the support of a vehicle driven wheel.

2. Description of the Prior Art

As a rotation sensor used in a wheel support bearing unit, a magnetic encoder type for an anti-lock brake system (ABS) has hitherto been employed widely. This is a type which makes use of a ring shaped magnetic encoder and includes a magnetic encoder, fitted to an outer periphery of a rotating side raceway ring, for example, an inner ring, and a magnetic sensor fitted to a stationary side raceway ring or a bearing end cover. (See, for example, the Patent Document 1 listed below.)

Other than the magnetic encoder type, arrangement has been suggested, in which a resolver is incorporated in a wheel support bearing assembly as a rotation sensor to detect rotation of a vehicle wheel. (See, for example, the Patent Document 2 listed below.)

On the other hand, As a rotation sensor capable of being incorporated in a small size machine and also capable of detecting a highly precise angle of rotation, the use has been suggested of a magnetic sensor array. (See, for example, the Patent Document 3 listed below.) This is of a structure in which, as shown in FIG. 7, a magnetic sensor array 45 including a plurality of magnetic sensor elements (MAGFETs) arranged in a predetermined pattern is integrated on a sensor chip 42 together with a circuit device 46 including a signal amplifying circuit, an AD converter circuit, and a digital signal processing circuit, which chip 46 is in turn arranged in face-to-face relation with a magnet 44 arranged on a rotating member 41. In this case, the magnet 44 is so designed as to have an anisotropy about the axis of rotation O and, on the sensor chip 42 referred to above, the magnetic sensor arrays 45 are arranged along each of four sides of the imaginary square shape.

With the rotation sensor 43 of the structure described above, respective outputs from the magnetic sensor arrays 45 along those four sides of the imaginary square shape are read by the signal amplifying circuit and the AD converter circuit to thereby detect a distribution of magnetic fields of the magnet 44 and, then, based on a result of such detection, the angle of rotation of the magnet 44 is calculated by the digital signal processing circuit.

A sensor IC for detecting the angle of rotation of the magnet, in which magnetic sensor elements such as, for example, Hall elements or MR elements are integrated together with processing circuits, is currently manufactured and published by some companies, although differing from a detecting method disclosed in the Patent Document 3 listed below. (Such includes, for example, a programmable magnetic rotary encoder (AS5040) available from AMS Co.) and a rotation position sensor IC (MLX90316) available from Melexis Inc.)

Patent Document 1: JP Laid-open Patent Publication No. 2006-105185, published Apr. 20, 2006.

Patent Document 2: JP Laid-open Patent Publication No. 2005-076729, published Mar. 24, 2005.

Patent Document 3: JP Laid-open Patent Publication No. 2004-037133, published Feb. 5, 2004.

Currently mass-produced types of rotation sensors of the magnetic encoder type are merely capable of detecting the velocity of rotation, but not capable of detecting the direction of rotation. To detect the direction of rotation with this rotation sensor, it is necessary to detect two rotation signals having respective phases different from each other and, for this purpose, the use of two magnetic encoders or the use of a magnetic sensor IC in which two sensor elements are mounted in the same package, is required. In such case, problems tend to occur that not only does the space for mounting increase, but also the cost increases. Also, since the magnetic encoder is of a ring shape fitted to an outer periphery or an inner periphery of the rotating side raceway ring, this necessitates an increase of the space for mounting.

Also, a signal from an ABS sensor can be utilized in various vehicle controls including, for example, a vehicle attitude control and in such case, a signal of high resolution is desired for. With the ABS sensor of the magnetic encoder type discussed above, since the resolving power depends on the number of magnetic poles of the magnetic encoder, it is necessary to minimize the forming pitch of the magnetic poles, but since minimization of the forming pitch of the magnetic poles will result in reduction in magnetic field strength, a large sensor gap can not be secured between the magnetic encoder and the magnetic sensor, thus imposing limitations on manufacturing thereof.

Where the rotation sensor of a resolver type disclosed in the Patent Document 2 quoted above is employed, problems arise in that not only does the size tend to increase for the mounting of the sensor, but also the cost tends to increase.

SUMMARY OF THE INVENTION

An object of the present invention is to provide a rotation sensor equipped wheel support bearing assembly, which can detect not only the velocity of rotation but also the direction of rotation, in which a high resolving rotation signal can be utilized in various vehicle controls and which can have a suppressed size for the detection of rotation.

The rotation sensor equipped wheel support bearing assembly according to the present invention is a rotation sensor equipped wheel support bearing assembly for rotatably supporting a vehicle wheel relative to a vehicle body, which assembly includes an outer member having an inner periphery formed with a plurality of rolling surfaces, an inner member having rolling surfaces formed so as to confront those rolling surfaces of the outer member, respectively, and a plurality of rows of rolling elements interposed between the respective rolling surfaces of the outer member and the inner member, in which a magnetic field generating element is provided in one of the outer member and the inner member in alignment with the bearing center axis and having an anisotropy about a bearing center axis, and a sensor, for sensing a magnetic field generated by the magnetic field generating element, provided in the other of the outer member and the inner member in alignment with the bearing center axis so as to confront axially the magnetic field generating element and operable to detect the angle of rotation of the magnetic field generating element. The term "anisotropy about the bearing center axis" referred to above is intended to mean that the magnetic field changes around the bearing center axis in dependence on rotation of the magnetic generating element. The sensor referred to above may be either a magnetic sensor array as will be described in detail later or a type capable of detecting the orientation of the magnetic field with a two-dimensional vector sensor to thereby detect the rotation of the magnetic field generating element.

According to this construction, since the sensor referred to above is of a type capable of detecting change in magnetic field, which results from rotation of the magnetic field generating element, with a sensor having a function of detecting the angle of rotation of the magnetic field generating element, a high resolving and highly precise detection of the angle of rotation can be achieved and not only the velocity of rotation, but also the direction of rotation can be detected. For this reason, a rotation signal so detected can be employed in various vehicle controls. Also, since the magnetic field generating element and the sensor are provided in alignment with the bearing center axis, the sensor employed may be of a type having a reduced size and, hence, even when it is mounted on the wheel support bearing assembly, no increase in size occur, allowing the wheel support bearing assembly as a whole to be suppressed to a reduced size.

In the present invention, the sensor referred to above may include a magnetic sensor array having magnetic sensor elements arranged in an array, a signal read-out circuit for reading a signal of the magnetic sensor array, and an angle calculating section for calculating the angle of rotation of the magnetic field generating element from an output of the signal read-out circuit.

According to this construction, since the sensor is of a type capable of detecting change in magnetic field, resulting from the rotation of the magnetic field generating element, with the magnetic sensor array and calculating the angle of rotation from respective output of the magnetic sensor elements forming the magnetic sensor array, a further high resolving and highly precise detection of the angle of rotation can be achieved and both of the velocity of rotation and the direction of rotation can also be detected. For this reason, the rotation signal so detected can be utilized in various vehicle controls. Also, since the magnetic field generating element and the sensor are so tailored as to be mounted in alignment with the bearing center axis and the sensor may be of a small size including the magnetic sensor array and circuit component parts, no increase in size will occur even when it is mounted on the wheel support bearing assembly and, therefore, the size of the wheel support bearing assembly as a whole can be suppressed to a minimized size.

Where the magnetic sensor array is employed, the sensor may be of a type in which the magnetic sensor array, the signal read-out circuit and the angle calculating section are integrated on a semiconductor chip. When the sensor is so designed as to form a sensor IC integrated on the semiconductor chip, the size thereof can be further reduced and, in view of the fact that it is arranged in alignment with the bearing center axis of the wheel support bearing assembly together with the magnetic field generating element and the sensor, the size of the wheel support bearing assembly can be further reduced.

It is to be noted that even where the sensor referred to is employed in the form of a type capable of detecting the orientation of the magnetic field with a two-dimensional vector sensor to thereby detect the rotation of the magnetic field generating element, a sensor IC, in which the magnetic sensor elements are integrated on the semiconductor chip together with processing circuits, may be employed.

In the present invention, a cover for covering an entire end of the wheel support bearing assembly fitted to the outer member, in which one of the magnetic field generating element and the sensor is fitted to such cover, the other of the magnetic field generating element and the sensor is fitted to the inner member.

In the case of this construction, since the entire end of the wheel support bearing assembly is covered by the cover, the use of a sealing member at one axial end of a bearing space, delimited between the outer member and the inner member, where the cover is mounted, can be dispensed with, resulting in simplification of the construction. Also, since the sensor can be protected by the cover, component parts of the sensor will not be exposed to foreign matter and/or muddy saline water and the reliability of the sensor can therefore be increased. Where the outer member is a rotating member, the magnetic field generating element is provided in the cover, and where the inner member is a rotating member, the sensor is fitted to the cover.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
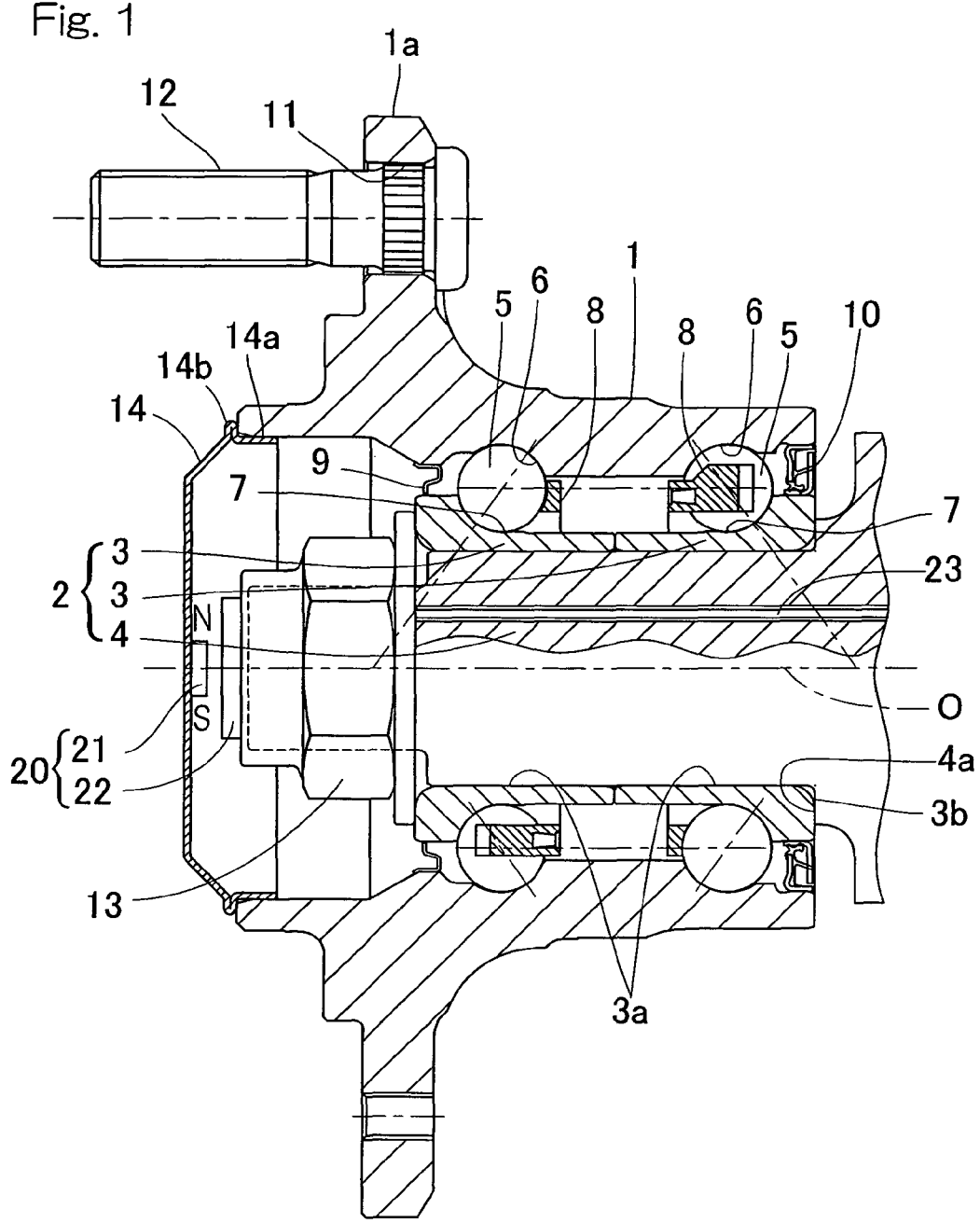
FIG. 1 is a sectional view of a rotation sensor equipped wheel support bearing assembly according to a first preferred embodiment of the present invention.

One preferred embodiment of the present invention will now be described in detail with particular reference to FIGS. 1 to 4. This embodiment is applied to a second generation model of an outer ring rotating type wheel support bearing assembly for the support of a driven vehicle wheel. It is to be noted that in the description that follows, one side of a vehicle body structure laterally away from the longitudinal center thereof in a condition, in which the bearing assembly is mounted on the vehicle body structure, is referred to as "outboard" while the opposite side of the vehicle body structure laterally close towards the longitudinal center thereof in the same condition is referred to as "inboard".

The wheel support bearing assembly of the present invention includes an outer member 1 which concurrently serves as a hub axle and has an inner periphery formed with a plurality of rolling surfaces 6 and 6, an inner member 2 having an outer periphery formed with rolling surfaces 7 and 7 confronting the respective rolling surfaces 6 and 6, and a plurality of rows of rolling elements 5 interposed between the opposed rolling surfaces 6 and 7 of the outer and inner members 1 and 2. This wheel support bearing assembly is rendered to be a double row angular contact ball bearing type, in which the rolling elements 5 are in the form of balls and are retained in a retainer 8 employed for each row. Each of the rolling surfaces 6 and 7 referred to above represents an arcuately sectioned shape with the rolling surfaces 6 and 7 so formed as to define back-to-back contact angles. A bearing space delimited between the outer member 1 and the inner member 2 has opposite outboard and inboard ends sealed by respective sealing members 9 and 10.

The outer member 1 concurrently serving as a hub axle is of one piece construction defining a rotating member and having a wheel mounting hub flange 1a formed in an outer periphery of an outboard end thereof. In assembling to an automotive vehicle, a brake rotor of a disc brake device and a vehicle wheel (both not shown) are fitted to the hub flange 1a in overlapped relation to each other by means of hub bolts 12, extending through respective bolt insertion holes 11 formed in the wheel mounting hub flange 1a, and corresponding hub nuts (not shown) threaded onto the respective hub bolts 12.

The inner member 2 serves as a stationary member and is made up of a pair of split inner rings 3 and 3, having the respective rolling surfaces 7 formed therein for the rows of the rolling elements 5, and an axle 4 inserted into and engaged in respective axle insertion holes 3a in those inner rings 3 and 3, and the inner rings 3 are coupled to the axle 4 by means of a nut 13 fastened to an outboard end of the axle 4. In that configuration, a stepped face 4a provided in the axle 4 so as to confront towards the outboard side is urged against an end face 3b of the inner ring 3 adjacent an inboard row, which is oriented towards the inboard side, to thereby clamp the inner rings 3 and 3 between the axle 4 and the nut 13.

A rotation sensor 20 incorporated in this wheel support bearing assembly includes a magnetic field generating element 21 provided in the outer member 1 in alignment with the bearing center axis O and having an anisotropy about this bearing center axis O, and a sensor 22 for sensing the magnetic field emanating from the magnetic field generating element 21, which is provided in the inner member 2 in alignment with the bearing center axis O so as to axially confront the magnetic field generating element 21. More specifically, a cover 14 for covering one entire end of the wheel support bearing assembly is fitted to the outboard end of the outer member 1, and the magnetic field generating element 21 in the form of a permanent magnet having a pair of magnetic poles N and S is arranged in this cover 14. The sensor 22 referred to above is arranged on an outboard end face of the axle 4 which is one of component parts of the inner member 2. The cover 14 has a front cylindrical portion 14a defined in an outer periphery thereof, which portion 14a is engaged with an inner diametric face of the outer member 1, and a collar 14b formed in the vicinity of the front cylindrical portion 14a is engaged with a widthwise face of the outer member 1, to thereby position axially the cover 14. In order to increase the water proofing property of the cover 14, a sealing member such as, for example, an O-ring may be added to a joint portion between the cover 14 and the outer member 1. An output cable 23 for extracting an output of the sensor 22 is wired inside the axle 4 and is drawn outwardly of the axle 4 at an appropriate location. In view of the capability of the permanent magnet, which serves as the magnetic field generating element 21, to rotate together with the outer member 1, the magnetic N-pole and the magnetic S-pole revolve about the bearing center axis O. The sensor 22 referred to above senses the magnetic field emanating from the magnetic field generating element 21 and then outputs information on the angle of rotation.

In such case, since the entire outboard end of the wheel support bearing assembly is covered by the cover 14, the sealing member 9 on the outboard side may be dispensed with. Also, since the rotation sensor 20 is protected by the cover 14, component parts of the rotation sensor 20 can be prevented from being exposed to foreign matter and/or muddy saline water and, therefore, the reliability of the rotation sensor 20 can be increased.

Figure 2:
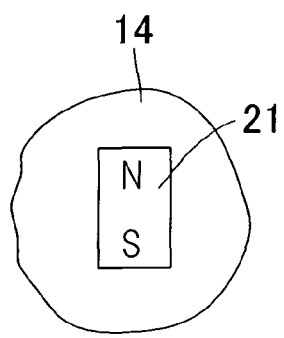
FIG. 2 is a front elevational view of a magnetic field generating element employed in the rotation sensor equipped wheel support bearing assembly shown in FIG. 1.

The magnetic field generating element 21 is of a rectangular shape when viewed in a direction along the bearing center axis O as shown in FIG. 2 and has its opposite ends magnetized to the N-pole and the S-pole, respectively. The permanent magnet 21 may be of any suitable shape such as, for example, round or semicircular.

Figure 3:
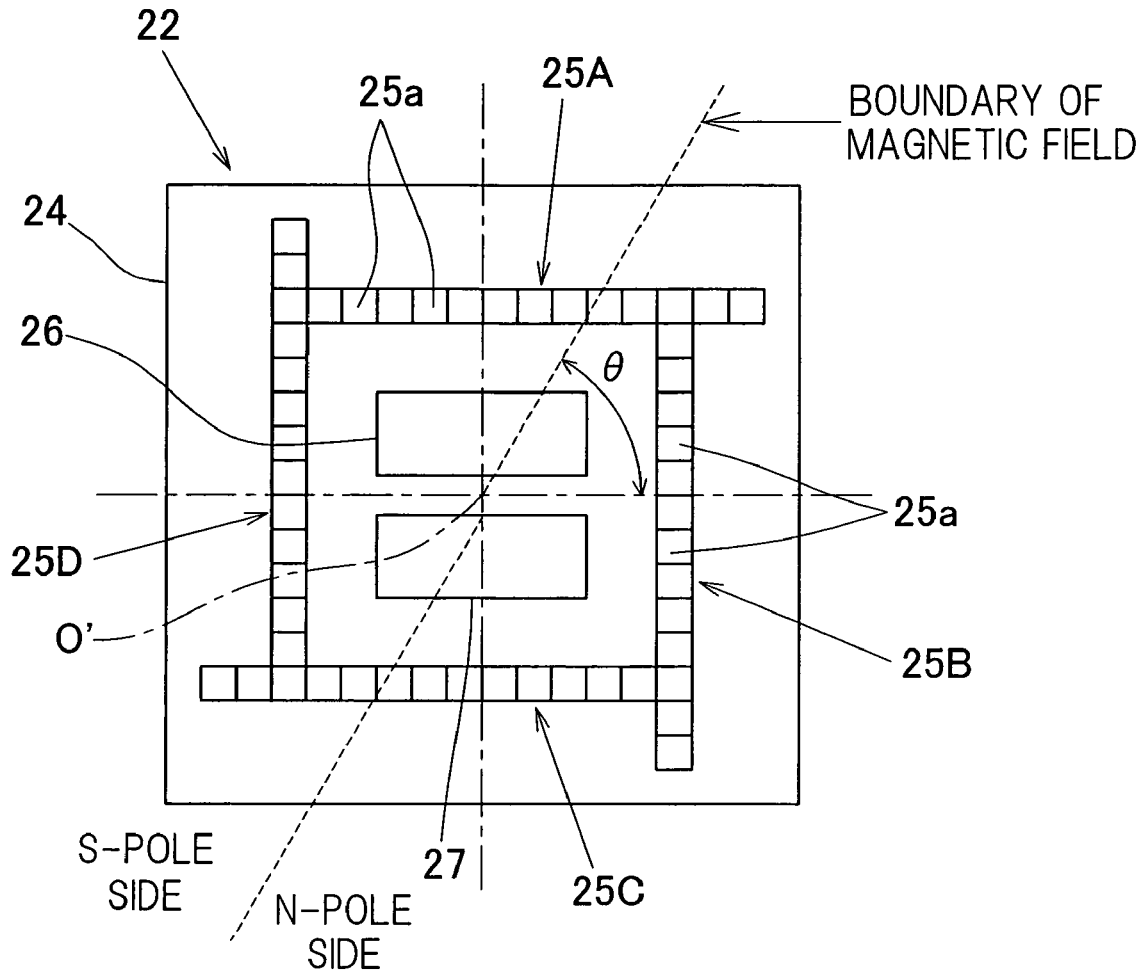
FIG. 3 is a top plan view of a semiconductor chip forming one example of a rotation sensor employed in the rotation sensor equipped wheel support bearing assembly shown in FIG. 1.

As shown in a top plan view in FIG. 3, the sensor 22 is of a structure in which a large scale integrated circuit is integrated on a single semiconductor chip 24. The large scale integrated circuit referred to above includes a plurality of magnetic sensor elements 25a arranged in an array to define magnetic sensor arrays 25A to 25D, a signal read-out circuit 26 for reading respective signals of the magnetic sensor arrays 25A to 25D, and an angle calculating section 27 for calculating an absolute value of the angle of rotation of the magnetic field generating element (permanent magnet) 21 from an output of the signal read-out circuit 26. The magnetic sensor arrays 25A to 25D are arranged on the semiconductor chip 24 in a four sided configuration, each array including magnetic sensor elements 25a that are laid along one of four sides of the imaginary square shape. In such case, the geometric center O' of the imaginary square shape is coincided with the position of the bearing center axis O on the semiconductor chip 24. Each of the magnetic sensor arrays 25A to 25D occupying the respective sides of the imaginary square shape is shown as comprised of the magnetic sensor elements 25a arranged in one line, but the magnetic sensor elements 25a may be arranged in a plurality of parallel rows. The signal read-out circuit 26 and the angle calculating section 27 are arranged inside the square arrangement of the magnetic sensor arrays 25A to 25D. The semiconductor chip 24 has a element forming surface and is fixed to an end face of the axle 4 with its element forming surface held in face-to-face relation with the permanent magnet 2 1.

It is to be noted that the magnetic sensor arrays 25A to 25D may, in place thereof, be of a structure, in which a plurality of Hall elements or MR elements are arranged on the same plane so as to occupy axes perpendicular to each other so that the magnetic field angle inside the plane can be detected.

As described above, where the magnetic sensor elements 25a and a calculating circuit unit (the signal read-out circuit 26 and the angle calculating section 27) are integrated together on the semiconductor chip 24, no wiring is required between the magnetic sensor elements 25a and the calculating circuit unit and, accordingly, the sensor 22 can be downsized, accompanied by an increase of the reliability against wiring breakage or the like and facilitating assemblage of the rotation sensor 20. In particular, where the calculating circuit unit is arranged inside the magnetic sensor arrays 25A to 25D arranged in the square pattern as described hereinabove, the size of the chip can be further reduced.

Figure 4:
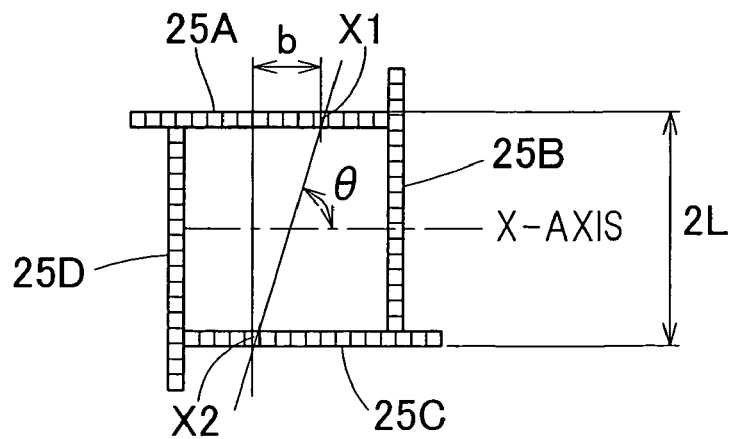
FIG. 4 is an explanatory diagram showing an angle calculating process performed by an angle calculating section incorporated in the rotation sensor shown in FIG. 3.
Figure 5:
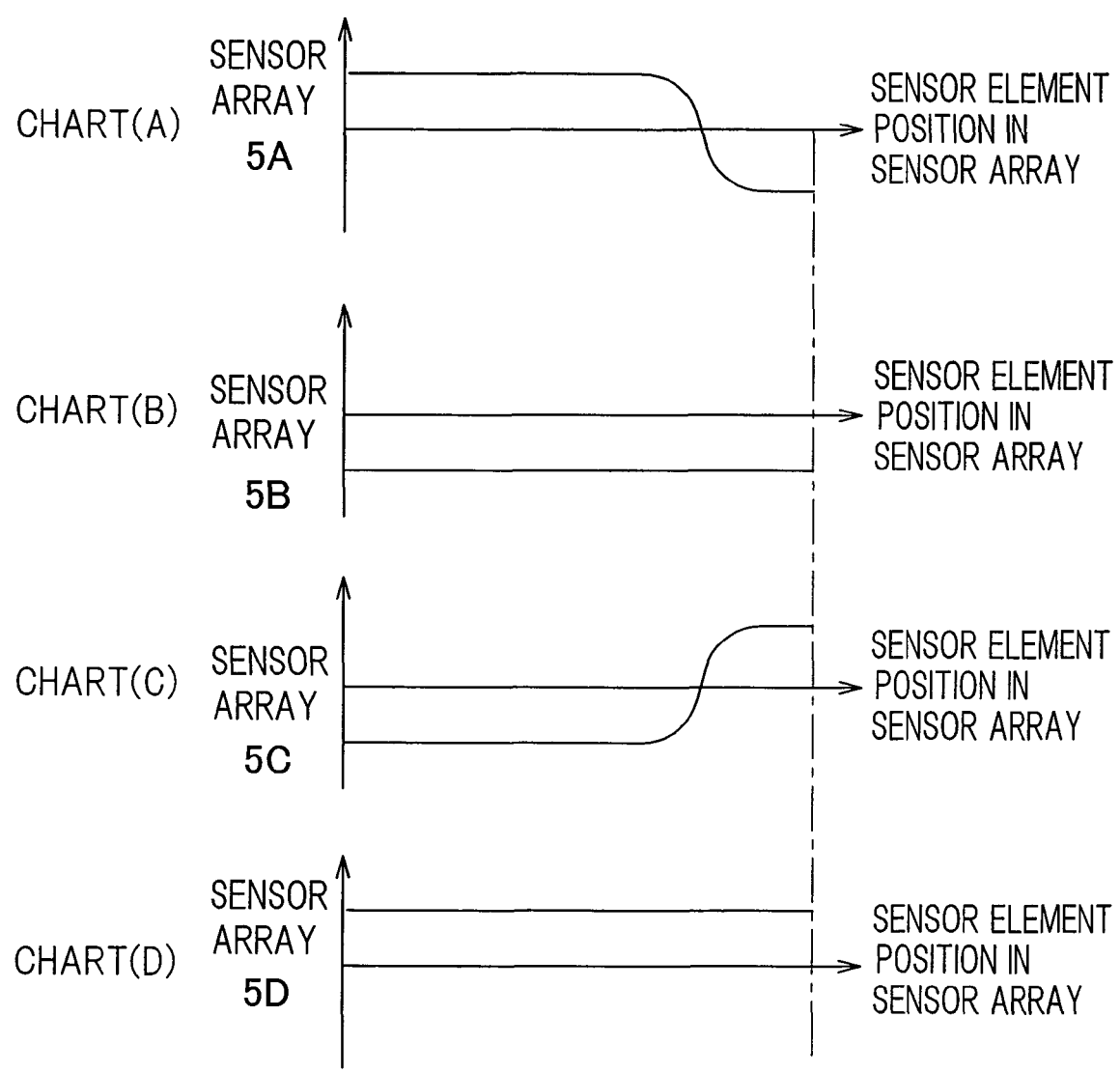
FIG. 5 shows charts illustrating waveforms of respective outputs from magnetic sensor arrays in the rotation sensor shown in FIG. 3.

FIGS. 4 and 5 illustrate explanatory diagrams showing a rotational angle calculating process performed by the angle calculating section 27. Charts (A) to (D) in FIG. 5 illustrate respective output waveforms exhibited by the magnetic sensor arrays 25A to 25D during rotation of the outer member 1 concurrently serving as a hub axle, where the axis of abscissas represents positions of the magnetic sensor elements 25a in each of the magnetic sensor arrays 25A to 25D and the axis of ordinates represents the strength of the magnetic field detected.

Where assuming that a zero crossing position, which is the boundary between the magnetic N-pole and the magnetic S-pole of the detected magnetic field of the magnetic sensor arrays 25A to 25D, lies at positions X1 and X2 sa shown in FIG. 4, signal respective outputs of the magnetic sensor arrays 25A to 25D represent such waveforms as shown in Charts (A) to (D) in FIG. 5. Accordingly, the zero crossing positions X1 and X2 can be calculated by means of colinear approximation from respective outputs of the magnetic sensor arrays 25A and 25C.

Calculation of the angle can be carried out by the following equation (1):

$$\theta = \tan^{-1}(2L/b) \quad (1)$$

where θ represents the angle of rotation of the permanent magnet 21 expressed in terms of the absolute angle (absolute value); 2L represents the length of one of four sides of the square shape defined by the magnetic sensor arrays 25A to 25D arranged in the square pattern; and b represents the transverse length between the zero crossing positions X1 and X2.

Where the zero crossing positions X1 and X2 lie at the magnetic sensor arrays 25B and 25D, respectively, the angle of rotation θ can be calculated in a manner similar to that described above, using data on the zero crossing positions that are obtained from the respective outputs of those magnetic sensor arrays 25B and 25D.

With the rotation sensor equipped wheel support bearing assembly of the structure described above, the sensor 22 is so designed that change in magnetic field brought about by rotation of the magnetic field generating element 21 is detected by the magnetic sensor arrays 25A to 25D and the angle of rotation is calculated from the respective outputs of the plural magnetic sensor elements 25a forming the magnetic sensor arrays 25A to 25D. Accordingly, rotational angle detection can be performed with a high resolution and high precision, even allowing the velocity of rotation but also the direction of rotation to be detected. For this reason, the rotation signal so detected can be used in various vehicle controls. Also, since the magnetic field generating element 21 and the sensor 22 are provided in alignment with the bearing center axis and the sensor 22 may be a sufficiently small component part made up of the magnetic sensor arrays 25A to 25D and the circuit component parts, mounting on the wheel support bearing assembly will not result in increase of the size and, therefore, the size of the wheel support bearing assembly as a whole can be suppressed to a minimized size. Since the sensor 22 referred to above includes a sensor IC, which has the semiconductor chip mounted with the magnetic sensor arrays 25A to 25D, and the signal read-out circuit and the angle calculating section 27, both forming circuit component parts, further downsizing can be achieved.

Figure 6:
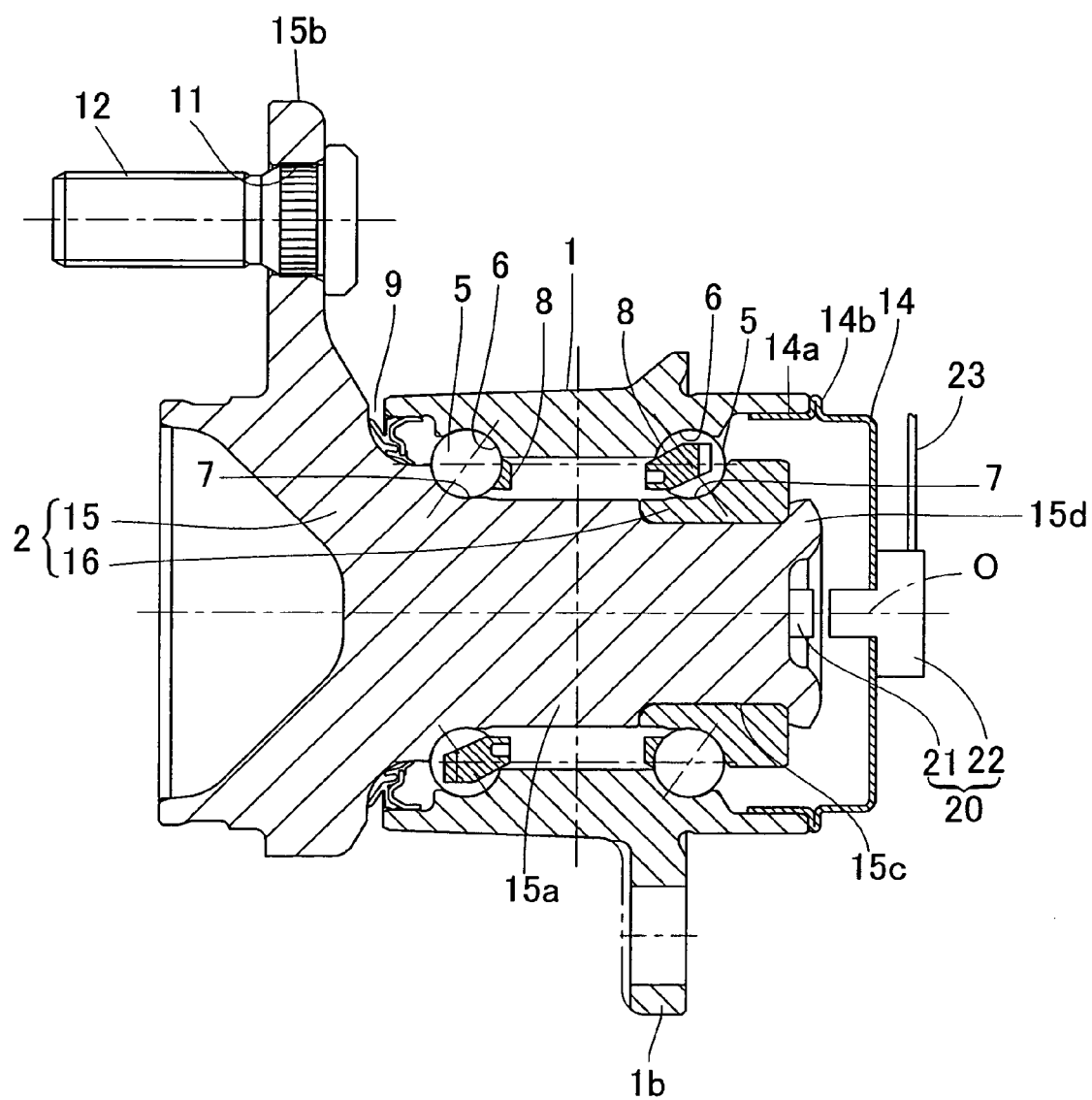
FIG. 6 is a sectional view of the rotation sensor equipped wheel support bearing assembly according to another preferred embodiment of the present invention.
Figure 7:
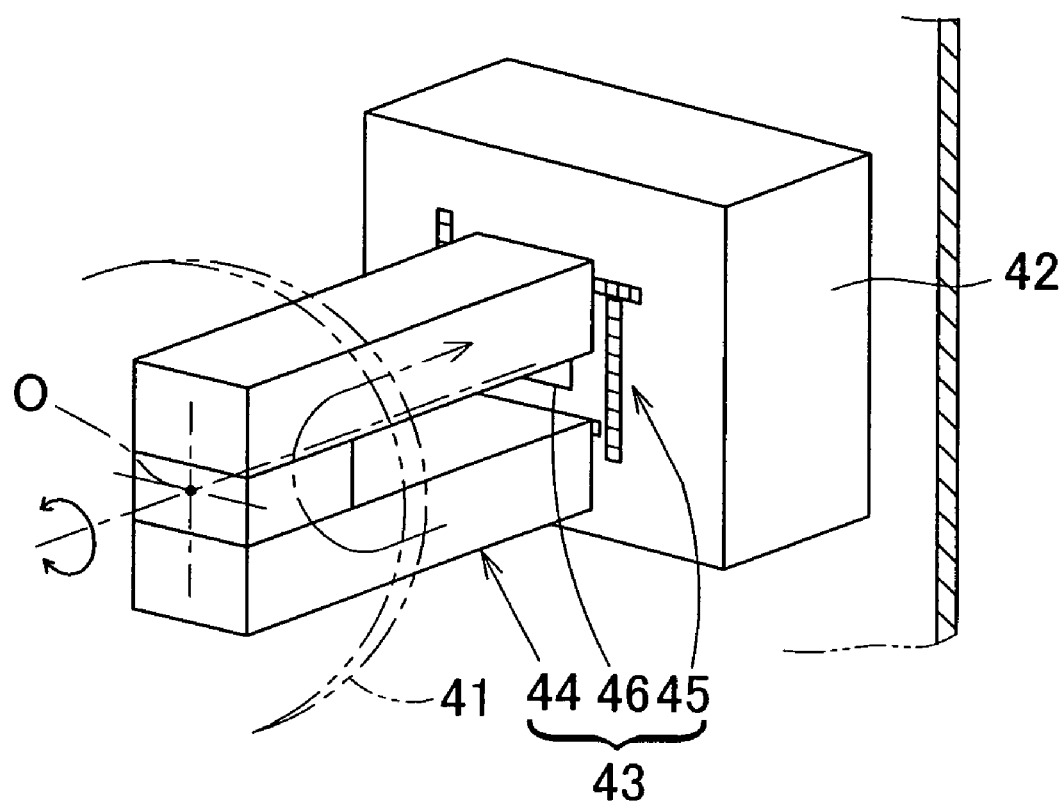
FIG. 7 is a perspective view of a conventional rotation sensor.

FIG. 6 illustrates another preferred embodiment of the present invention. This wheel support bearing assembly is applied to a third generation model of an inner ring rotating type wheel support bearing assembly for the support of a vehicle driven wheel. This wheel support bearing assembly includes an outer member 1 having an inner periphery formed with a plurality of rolling surfaces 6, an inner member 2 having an outer periphery formed with rolling surfaces 7 so as to confront the rolling surfaces 6, respectively, and a plurality of rows of rolling elements 5 interposed between the rolling surfaces 6 in the outer member 1 and the rolling surfaces 7 in the inner member 2 that confront the associated rolling surfaces 6 in the outer member 1. Even this wheel support bearing assembly is rendered to be a double row angular contact ball bearing type, in which the rolling elements 5 are employed in the form of balls and are retained by a retainer 8 employed for each of the rows. Each of the rolling surfaces 6 and 7 referred to above represents an arcuately sectioned shape with the rolling surfaces 6 and 7 so formed as to define back-to-back contact angles. An outboard end of a bearing space delimited between the outer member 1 and the inner member 2 is sealed by an outboard sealing member 9, but an inboard end thereof is not sealed by any sealing member.

The outer member 1 serves as a stationary member and is of one piece construction having a vehicle body fitting flange 1b, through which the wheel support bearing assembly is secured to a knuckle (not shown) on the side of the vehicle body structure by means of bolts (not shown).

The inner member serves as a rotating member and is made up of a wheel hub 15 and an inner ring 16 with the outboard and inboard rolling surfaces 7 defined in the wheel hub 15 and the inner ring 16, respectively. A brake rotor of a disc brake device and a vehicle wheel (both not shown) are fitted to the hub flange 15b in overlapped relation to each other by means of hub bolts 12, extending through respective bolt insertion holes 11, and corresponding hub nuts (not shown) threaded onto the respective hub bolts 12.

The inner ring 16 is mounted on the inner ring mounting area 15c in the wheel hub 15 and fixed in position on the wheel hub 15 by means of a crimped portion 15d forming a part of the wheel hub 15. This crimped portion 15d is formed by means of a rolling crimping applied to a cylindrical portion, which extends inboards from an inboard end of the wheel hub 15, of the wheel hub 15, so as to expand radially outwardly.

The rotation sensor 20 that is incorporated in this wheel support bearing assembly includes a magnetic field generating element 21 provided in the outer member 1 in alignment with the bearing center axis O and having an anisotropy about this bearing center axis O, and a sensor 22 provided in the inner member 2 in alignment with the bearing center axis O so as to axially confront the magnetic field generating element 21, for sensing the magnetic field emanating from the magnetic field generating element 21. More specifically, the magnetic field generating element 21 in the form of a permanent magnet having a pair of magnetic poles N and S is arranged on an inboard end of the wheel hub 15 forming one of the component parts of the inner member 2. A cover 14 for covering one entire end of the wheel support bearing assembly is fitted to the inboard end of the wheel support bearing assembly and the sensor 22 referred to above is fitted by bonding or insert molding to this cover 14. A portion of the cover 14 where the sensor 22 is mounted may be provided with a sealing member such as, for example, an O-ring to strength the sealing. Also, in order to increase the water proofing property of the cover 14, a sealing member such as, for example, an O-ring may be added to a joint between the cover 14 and the wheel hub 15. Although the inboard sealing member for sealing the bearing space delimited between the outer member 1 and the inner member 2 is dispensed with as hereinabove described, the entire inboard end of the wheel support bearing assembly is covered by the cover 14 and, accordingly, sealing at the inboard end is achieved. An output cable 23 for extracting an output of the sensor 22 extends outwardly from the sensor 22 towards the vehicle body structure side. The cover has a front cylindrical portion 14a defined in an outer periphery thereof, which portion 14a is engaged with an inner diametric face of the outer member 1, and a collar 14b formed in the vicinity of the front cylindrical portion 14a is engaged with a widthwise face of the outer member 1 with the sensor 22, whereby the cover 14 is positioned axially. Other structural features than those described above are similar to those in the previously described embodiment of the present invention.

Even in this case, since the rotation sensor 20 is protected by the cover 14, component members of the rotation sensor 20 will not be exposed to foreign matter and/or muddy saline water and, therefore, the reliability of the rotation sensor 20 can be increased.

It is to be noted that although in the foregoing embodiments as the sensor 22, the one having the magnetic sensor arrays 25A to 25D has been employed, the sensor referred to above may be employed in the form of a type capable of detecting the orientation of the magnetic field with a two-dimensional vector sensor to thereby detect the rotation of the magnetic field generating element. Even where this two-dimensional vector sensor is employed, a sensor IC, in which the magnetic sensor elements are integrated on the semiconductor chip together with processing circuits, may be employed.

What is claimed is:

1. A rotation sensor equipped wheel support bearing assembly to rotatably support a vehicle wheel relative to a vehicle body, comprising:
    an outer member having an inner periphery formed with a plurality of rolling surfaces;
    an inner member having rolling surfaces formed so as to confront those rolling surfaces of the outer member, respectively;
    a plurality of rows of rolling elements interposed between the respective rolling surfaces of the outer member and the inner member;
    a magnetic field generating element provided in the inner member in alignment with a bearing center axis and having an anisotropy about the bearing center axis; and
    a sensor, to sense a magnetic field generated by the magnetic field generating element, provided on the outer member in alignment with the bearing center axis so as to confront axially the magnetic field generating element, and operable to detect the angle of rotation of the magnetic field generating element,
    wherein the sensor includes four magnetic sensor arrays arranged in a square shape, each of the arrays having magnetic sensor elements arranged in an array, a signal read-out circuit to read a signal of the magnetic sensor array, and an angle calculating section to calculate the angle of rotation of the magnetic field generating element from an output of the signal read-out circuit, the signal read-out circuit and the angle calculating section being arranged inside the square arrangement of the magnetic sensor arrays,
    wherein the inner member includes a wheel hub and an inner ring mounted on and fixed to an inboard end portion of the wheel hub by means of a crimped portion, the crimped portion being formed by crimping a cylindrical portion that extends inboard from the inboard end of the wheel hub, and
    wherein the magnetic field generating element is arranged in a recessed portion formed in the cylindrical portion of the crimped portion.

2. The rotation sensor equipped wheel support bearing assembly as claimed in claim 1, wherein the sensor includes the magnetic sensor array, the signal read-out circuit and the angle calculating section integrated on a semiconductor chip.

3. The rotation sensor equipped wheel support bearing assembly as claimed in claim 1, further comprising a cover to cover an entire end of the wheel support bearing assembly fitted to the outer member, wherein one of the magnetic field generating element and the sensor is fitted to the cover and the other of the magnetic field generating element and the sensor is fitted to the inner member.

4. The rotation sensor equipped wheel support bearing assembly as claimed in claim 3, wherein the outer member is a rotating member and the magnetic field generating element is provided in the cover.

5. The rotation sensor equipped wheel support bearing assembly as claimed in claim 3, wherein the inner member is a rotating member and the sensor is fitted to the cover.

* * * * *